(12) United States Patent
Sathyendra et al.

(10) Patent No.: US 9,299,010 B2
(45) Date of Patent: Mar. 29, 2016

(54) DATA FUSION ANALYSIS FOR MARITIME AUTOMATIC TARGET RECOGNITION

(71) Applicant: RAYTHEON COMPANY, Waltham, MA (US)

(72) Inventors: Harsha Modur Sathyendra, McKinney, TX (US); Bryan D. Stephan, Garland, TX (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 14/295,193

(22) Filed: Jun. 3, 2014

(65) Prior Publication Data

US 2015/0347871 A1    Dec. 3, 2015

(51) Int. Cl.
*G06K 9/00*    (2006.01)
*G06K 9/62*    (2006.01)
*G06K 9/52*    (2006.01)

(52) U.S. Cl.
CPC .......... *G06K 9/6267* (2013.01); *G06K 9/00624* (2013.01); *G06K 9/52* (2013.01)

(58) Field of Classification Search
CPC ............... G01S 2013/9064; G01S 13/9035; G01S 13/89; G01S 7/295; G01S 7/411; G01S 7/412; G06K 9/6298
See application file for complete search history.

(56) References Cited

U.S. PATENT DOCUMENTS

| | | | |
|---|---|---|---|
| 6,255,981 B1 | 7/2001 | Samaniego | |
| 6,687,577 B2 * | 2/2004 | Strumolo | 701/1 |
| 7,116,265 B2 * | 10/2006 | Shu et al. | 342/25 R |
| 7,889,232 B2 * | 2/2011 | Chew | 348/159 |
| 8,063,815 B2 * | 11/2011 | Valo et al. | 342/25 R |
| 8,232,908 B2 | 7/2012 | Sathyendra | |
| 2010/0052977 A1 * | 3/2010 | Sathyendra | 342/25 F |
| 2012/0286989 A1 | 11/2012 | Sathyendra et al. | |

OTHER PUBLICATIONS

Fechner et al., "A Hybrid Neural Network Architecture for Automatic Object Recognition," IEEE, pp. 187-194, 1994.
Manikandan et al., "Evaluation of Edge Detection Techniques towards Implementation of Automatic Target Recognition," IEEE, pp. 441-445, 2007.
Musman et al., "Automatic Recognition of ISAR Ship Images," IEEE, 32(4): 1392-1404, 1996.
Pastina et al., "Multi-feature based automatic recognition of ship targets in ISAR images," IEEE, 6 pages, 2008.

(Continued)

*Primary Examiner* — Tom Y Lu
(74) *Attorney, Agent, or Firm* — Lewis Roca Rothgerber Christie LLP

(57) ABSTRACT

A system and method for performing Automatic Target Recognition by combining the outputs of several classifiers. In one embodiment, feature vectors are extracted from radar images and fed to three classifiers. The classifiers include a Gaussian mixture model neural network, a radial basis function neural network, and a vector quantization classifier. The class designations generated by the classifiers are combined in a weighted voting system, i.e., the mode of the weighted classification decisions is selected as the overall class designation of the target. A confidence metric may be formed from the extent to which the class designations of the several classifiers are the same. This system is also designed to handle unknown target types and subsequent re-integration at a later time, effectively, artificially and automatically increasing the training database size.

20 Claims, 6 Drawing Sheets

(56) References Cited

OTHER PUBLICATIONS

Sathyendra et al., "Automated Radar Image Target Recognition Based on Segmented Feature Extraction Using Adaptive Length Estimation and Hough Lines Aiding Optimized Neural Network Classification," Raytheon Co., 5 pages.
Sathyendra et al.,"Data Fusion Analysis for Maritime Automatic Target Recognition," Raytheon Co., 8 pages.
Zhang et al., "Automatic Model Construction for Object Recognition Using ISAR Images," IEEE, pp. 169-173, 1996.
Zeljković et al., "Automatic algorithm for inverse synthetic aperture radar images recognition and classification," IET Radar Sonar Navig., 4(1):96-109, 2010.
Duch, et al., "Eliminators and Classifiers", Lee, S.Y., ed.: 7th International Conference on Neural Information Processing (ICONIP), Dae-jong, Korea, Feb. 2, 2000, XP055207220, URL:http://www.fizyka.umk.pl/publications/kmk/00eliminator.pdf, (retrieved from internet Aug. 11, 2011 (6 pgs.).
Haykin, "Section 2.12 Adaptation", In: "Neural Networks: A Comprehensive Foundation", Feb. 2, 1999, Prentice Hall, XP055207548, (pp. 83-84).
Huan, et al. "Decision fusion strategies for SAR image target recognition", IET Radar, Sonar and Navigation, vol. 5, No. 7, Aug. 4, 2011, XP006038636, ISSN: 1751-8792, DOI: 10.1049/IET-RSN:20100319 (pp. 747-755).
Kuncheva, "Chapter 3.2 Terminologies and Taxonomies, Chapter 4.3 Weighted Majority Vote", In: "Combining Pattern Classifiers: Methods and Algorithms", Feb. 2, 2005, John Willey & Songs, XP055207537 (pp. 104-107; 122-125).
Lillesand et al., "Chapter 7.8 Supervised Classification" In: "Remote Sensing and Image Interpretation", Feb. 2, 2004, John Willey & Sons, XP055207555 (pp. 552-554).
Liu, et al. "Decision fusion of sparse representation and support vector machine for SAR image target recognition", Neurocomputing, Elsevier Science Publishers, Amsterdam, NL., vol. 113 Mar. 5, 2013 XP028535868, ISSN: 0925-2312, DOI: 10.1016/J. Neucom. 2013.01.033 (pp. 97-104).
Radoi, et al., "Improving the radar target classification results by decision fusion", Radar Conference 2003, Proceedings of the international Adelaide, SA, Australia Sep. 3-5, 2003, Piscataway, NJ, USA, IEEE, US, Sep. 3, 2003 XP010688698, DOI: 10.1109/RADAR.2003.1278731 ISBN: 978-0-7803-7870-4 (pp. 162-165).
Sathyendra, et al., "Automated Radar Image Target Recognition Based on Segmented Feature Extraction Using Adaptive Length Estimation and Hough Lines Aiding Optimized Neural Network Classification", 2013 IEEE Radar Conference (RADARCON13), IEEE, Apr. 29, 2013, XP032479593, ISSN: 1097-5659, DOI: 10.1109/RADAR.2013.6585986, ISBN: 978-1-4673-5792-0 [retrieved Aug. 23, 2013] (p. 1-5).
Sathyendra, et al., "Effects of Using Enhanced Input Range Profiles for 1-d Automated Maritime Vessel Classification" 2014 IEEE Radar Conference, IEEE, XP032628115, DOI: 10.1109/RADAR.2014.6875566 May 19, 2014 [retrieved on Sep. 10, 2014] (pp. 0112-0117).
Tulyakov, et al, "Review of Classifier Combination Methods", In: Video Analytics for Business Intelligence, Jan. 1, 2008, Springer Berlin Heidelberg, Berlin, Heidelberg, XP055207223, ISSN: 1860:949X, ISBN: 978-3-64-228598-1, vol. 90, pp. 361-386, DOI: 10.1007/978-3-540-76280-5_14, (26 pgs.).
Wilson, et al., "Combining Cross-validation and Confidence to Measure Fitness", Neural Networks, 1999 INCNN '99. International Joint Conference on Washington, DC, USA Jul. 10-16, 1999, Piscataway, NJ, USA, IEEE, US, vol. 2, Jul. 10, 1999, XP010372779, DOI: 10.1109/IJCNN.1999.831170, ISBN: 978-0-7803-5529-3 (pp. 1409-1414).
Yella, et al., "Condition monitoring of wooden railway sleepers", Transportation Research. Part C, Emerging Technologies, Pergamon, New York, NY, GB, vol. 17, No. 1, Feb. 1, 2009, XP025881100, ISSN: 0968-090X, DOI: 10.1016/J.TRC.2008.06.002 [retrieved on Sep. 14, 2008] (pp. 38-55).
Written Opinion of the International Searching Authority for International Application No. PCT/US2015/033063 filed May 28, 2015, Written Opinion of the International Searching Authority mailed Aug. 19, 2015 (9 pgs.).
International Search Report for International Application No. PCT/US2015/033063, filed May 28, 2015, International Search Report dated Aug. 12, 2015 and mailed Aug. 19, 2015 (5 pgs.).

\* cited by examiner

DATA FUSION ANALYSIS FOR MARITIME AUTOMATIC TARGET RECOGNITION

BACKGROUND

1. Field

One or more aspects of embodiments according to the present invention relate to automatic target recognition and more particularly to combining several classifiers in a system and method for automatic target recognition in radar images.

2. Description of Related Art

Inverse synthetic aperture radar (ISAR) is a signal processing technique used to form a two-dimensional (2-D) radar image from moving target objects by separating radar returns in Doppler frequency and in range. ISAR is possible with or without radar platform motion. An ISAR 2-D image is comprised of different intensity pixels of reflected point scatterers located at particular range and Doppler bin indices. Different Doppler shifts arise from different points along the rotating target, each point having its own line of sight (LOS) velocity toward the radar. Currently existing ISAR Automatic Target Recognition (ATR) systems may rely on a human component; in such systems trained operators look at ISAR images and match certain target features to canned templates. Such features may include the apparent length of a target and its proportions to dominant scatterer locations. Existing ATR systems are primarily based on look-up tables, which utilize user-defined features and a classifier to realize the closest template match to a given target. Existing ATR systems may be developed using simulated data, which may lack important characteristics of real data, such as noise spikes, competing land and high sea state clutter returns, range and Doppler smearing, and atmospheric confrontations; such systems may be prone to errors, and may become confused when presented with targets that do not correspond to a known target type. Moreover, an existing ATR system may not provide an assessment of the confidence with which an identification is made. Thus, there is a need for an ATR system with improved reliability, which generates confidence estimates, and which can accommodate unknown target types.

SUMMARY

In one embodiment of a system and method for performing automatic target recognition by combining the outputs of several classifiers, feature vectors are extracted from radar images and fed to three classifiers. The classifiers include a Gaussian mixture model neural network, a radial basis function neural network, and a vector quantization classifier. The class designations generated by the classifiers are combined in a weighted voting system, i.e., the mode of the weighted classification decisions is selected as the overall class designation of the target. A confidence metric may be formed from the extent to which the class designations of the several classifiers are the same.

According to an embodiment of the present invention there is provided a method for automatic target recognition of a target, the method including: receiving a sequence of imaging radar images of the target; forming a feature vector including measured characteristics of the target; performing a first target recognition attempt, the performing of the first target recognition attempt including: using a Gaussian mixture model neural network classifier to generate a first plurality of probability likelihoods, each of the first plurality of probability likelihoods corresponding to one of a plurality of candidate target types; and using a first set of class designation rules to produce a first class designation, the first class designation corresponding to one of the plurality of candidate target types; performing a second target recognition attempt, the performing of the second target recognition attempt including: using a radial basis function neural network classifier to generate a second plurality of probability likelihoods, each of the second plurality of probability likelihoods corresponding to one of a plurality of candidate target types; and using a second set of class designation rules to produce a second class designation, the second class designation corresponding to one of the plurality of candidate target types; performing a third target recognition attempt, the performing of the third target recognition attempt including: using a vector quantization classifier to generate a third plurality of probability likelihoods, each of the third plurality of probability likelihoods corresponding to one of a plurality of candidate target types; and using a third set of class designation rules to produce a third class designation, the third class designation corresponding to one of the plurality of candidate target types; and combining the first class designation, the second class designation and the third class designation to generate an overall class designation.

In one embodiment, the combining of the first class designation, the second class designation and the third class designation to generate an overall class designation includes forming a weighted combination of the first class designation, the second class designation and the third class designation.

In one embodiment, the forming a weighted combination of the first class designation, the second class designation and the third class designation includes weighting the first class designation with a weight of 2, weighting the second class designation with a weight of 2, and weighting the third class designation with a weight of 1.

In one embodiment, the method includes combining the first class designation, the second class designation and the third class designation to generate a confidence metric.

In one embodiment, the combining of the first class designation, the second class designation and the third class designation to generate a confidence metric includes taking the ratio of: the weights for class designations equal to the overall class designation; to the total of the weights for the first class designation, the second class designation and the third class designation.

In one embodiment, the plurality of candidate target types includes a plurality of known target types and a joint target type.

In one embodiment, the plurality of candidate target types includes an unknown target type.

In one embodiment, the plurality of candidate target types includes an unknown large target type and an unknown small target type.

In one embodiment, the unknown large target type includes targets with an estimated length exceeding a length of a largest known target type by 30 feet.

In one embodiment, the unknown small target type includes targets with an estimated length less than a length of a smallest known target type by 20 feet.

In one embodiment, the Gaussian mixture model neural network classifier includes classification parameters; and one of the classification parameters is adjusted in response to class designations corresponding to an unknown target type.

In one embodiment, the plurality of candidate target types includes an undeterminable target type.

In one embodiment, the using of a first set of class designation rules to produce a first class designation includes producing a first class designation corresponding to the undeterminable target type when each of the first plurality of probability likelihoods is less than a first threshold.

In one embodiment, the using of a second set of class designation rules to produce a second class designation includes producing a second class designation corresponding to the undeterminable target type when each of the second plurality of probability likelihoods is less than a second threshold.

In one embodiment, the receiving of a sequence of imaging radar images of the target includes receiving a sequence of inverse synthetic aperture radar images of the target.

According to an embodiment of the present invention there is provided a system for automatic target recognition of a target, the system including a processing unit configured to: receive a sequence of imaging radar images of the target; form a feature vector including measured characteristics of the target; perform a first target recognition attempt, the performing of the first target recognition attempt including: using a Gaussian mixture model neural network classifier to generate a first plurality of probability likelihoods, each of the first plurality of probability likelihoods corresponding to one of a plurality of candidate target types; and using a first set of class designation rules to produce a first class designation, the first class designation corresponding to one of the plurality of candidate target types; perform a second target recognition attempt, the performing of the second target recognition attempt including: using a radial basis function neural network classifier to generate a second plurality of probability likelihoods, each of the second plurality of probability likelihoods corresponding to one of a plurality of candidate target types; and using a second set of class designation rules to produce a second class designation, the second class designation corresponding to one of the plurality of candidate target types; perform a third target recognition attempt, the performing of the third target recognition attempt including: using a vector quantization classifier to generate a third plurality of probability likelihoods, each of the third plurality of probability likelihoods corresponding to one of a plurality of candidate target types; and using a third set of class designation rules to produce a third class designation, the third class designation corresponding to one of the plurality of candidate target types; and combine the first class designation, the second class designation and the third class designation to generate an overall class designation.

In one embodiment, the combining of the first class designation, the second class designation and the third class designation to generate an overall class designation includes forming a weighted combination of the first class designation, the second class designation and the third class designation.

In one embodiment, the forming a weighted combination of the first class designation, the second class designation and the third class designation includes weighting the first class designation with a weight of 2, weighting the second class designation with a weight of 2, and weighting the third class designation with a weight of 1.

In one embodiment, the system includes combining the first class designation, the second class designation and the third class designation to generate a confidence metric.

In one embodiment, the combining of the first class designation, the second class designation and the third class designation to generate a confidence metric includes taking the ratio of the weights for class designations equal to the overall class designation; to the total of the weights for the first class designation, the second class designation and the third class designation.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a data fusion analysis for maritime ATR provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

In one embodiment, an ATR problem starts by identifying relevant target features that can be extracted. For an ISAR image this is particularly important, because of the ambiguities in the Doppler dimension. The range dimension more aptly represents physical distances of targets, and thus can be used more directly for feature extraction purposes. Apparent length ($L_a$) is the length as determined from a target in an ISAR image. A corresponding true physical length is found by dividing the apparent length by the cosine of its aspect angle $\Theta_{asp}$, which is defined as the angle formed by the radar line of sight (LOS) and the longitudinal axis of the target. This angle is a function of azimuth as well as elevation. Aside from length, a maritime target can have other distinguishing features, such as mast(s), superstructure(s), rotating object(s), reflector(s), etc. These locations, which may be referred to as points of interest (POIs) can be used in distinguishing targets and discriminating between them.

Feature extraction is important when distinguishing between classes. In one embodiment, the process begins by isolating the target region using a segmentation technique; edges are then detected using target lines found by Hough processing.

Figure 1:
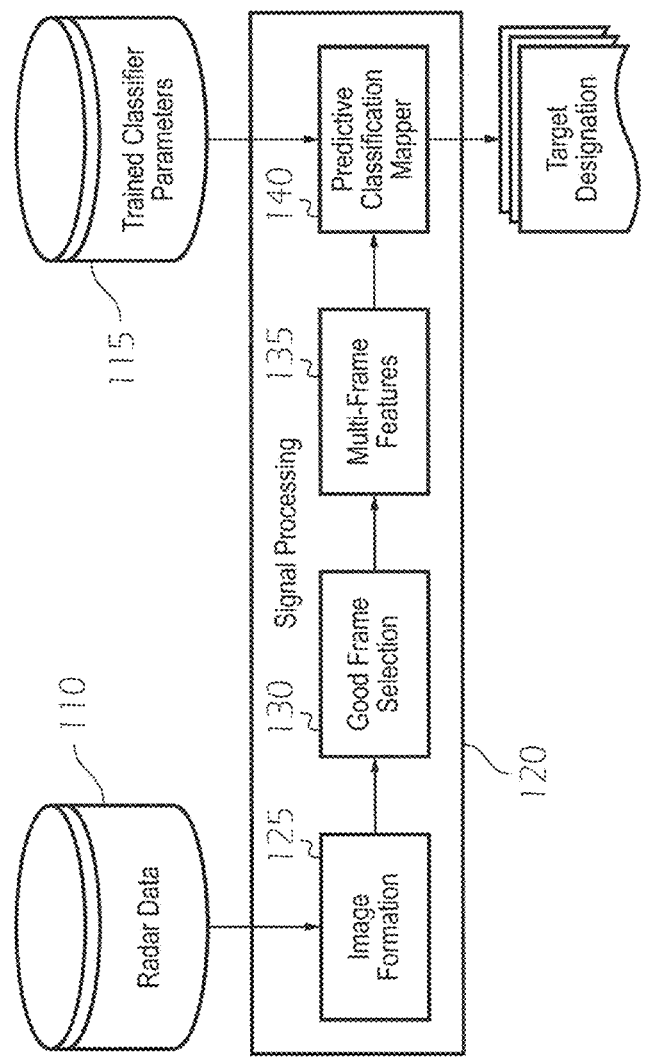
FIG. 1 is a block diagram of a system and method for automatic target recognition according to an embodiment of the present invention.

FIG. 1 represents an overall block diagram for an ATR engine process according to one embodiment. Data inputs include radar data 110 and the trained classifier parameters 115, which are fed into the signal processing block 120 to attain the target designations for the radar data 110. Off-line training is used to determine the trained classifier parameters 115 that can then be used in real time to determine the class designation for a given input image. The signal processing block includes an image formation block 125 that creates the input 2-D image. The second step is to determine, in a good frame selection block 130, the suitability of the input image for the classification problem. If the image is deemed suitable, a feature vector is extracted from the image in a multi-frames features block 135. A stored history of one-dimensional (1-D) features from previous frames also aids in this feature vector extraction process. The extracted features together act as inputs for the predictive classification mapper 140 that determines a target class.

The inputs to the image formation block 125 are radar video phase histories and auxiliary data. In this embodiment ISAR is used to form a 2-D image with Doppler on the y-axis and range on the x-axis. Good frame selection pre-screening is crucial for correct classification. The first image screening approach makes sure that the target aspect angle $\Theta_{asp}$ occurs in the interval of $-45 \leq \Theta_{asp} \leq 45$ degrees. If this is not the case then the image is rejected as an unsuitable frame for classification. Target aspect angles outside of this bound lead to the target being warped in either the range dimension or the Doppler dimension, or both, which results in erroneous determinations of true length and similar parameters.

Figure 2:
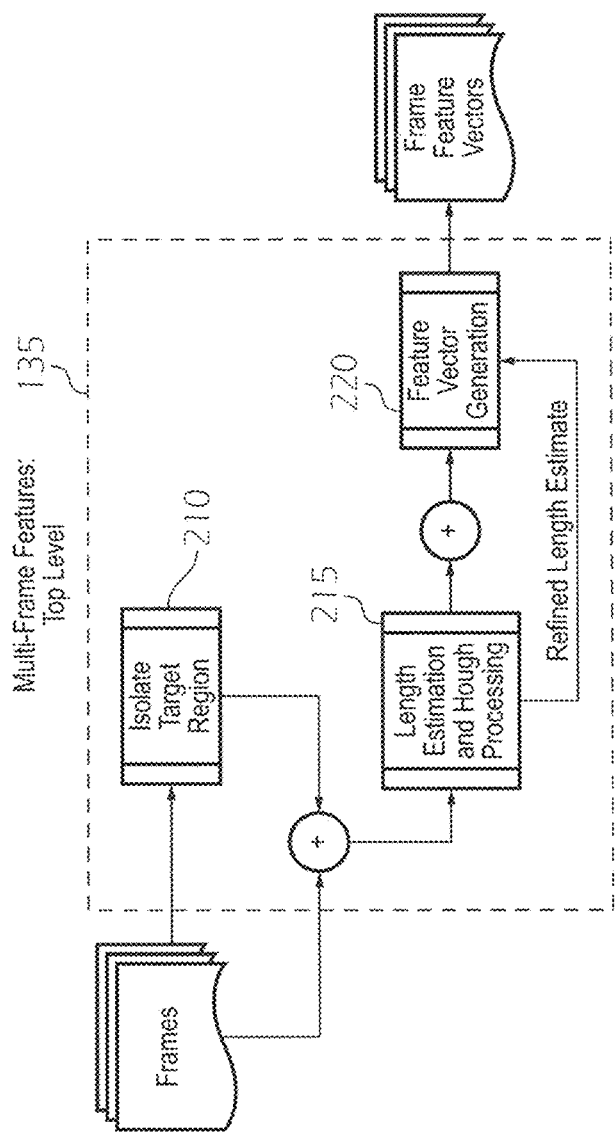
FIG. 2 is a block diagram of feature extraction according to an embodiment of the present invention.

FIG. 2 represents the top level block diagram for the frame's feature extraction algorithms, wherein the dashed area, representing the multi-frames features block 135, repeats for each frame. The isolate target region block 210 isolates a rough silhouette of the target region, which acts as a submask in conjunction with the input image to form the input to the length estimation and Hough processing block 215. The target length is estimated and the target range region is further refined, and acts as input to the Hough processing algorithms. The Hough peaks and Hough lines for the targets are extracted, as well as a refined target length estimate, which act as input to the feature vector generation block 220. The feature vector generation block 220 constructs the frame's feature vector, which is used for classifier training and for testing. Training occurs off line and with the multi-frames features block 135 processing repeating for each training frame. Training may be performed with real radar data, e.g., ISAR data obtained in the field, to avoid the disadvantages associated with using simulated data for training. A set of real data may then be separated into a subset used for training, and a second subset used for testing, to assess the performance of the ATR system after training. Testing occurs in real time and for a single frame, which is processed through the full ATR engine, until a class designation is determined.

Figure 3:
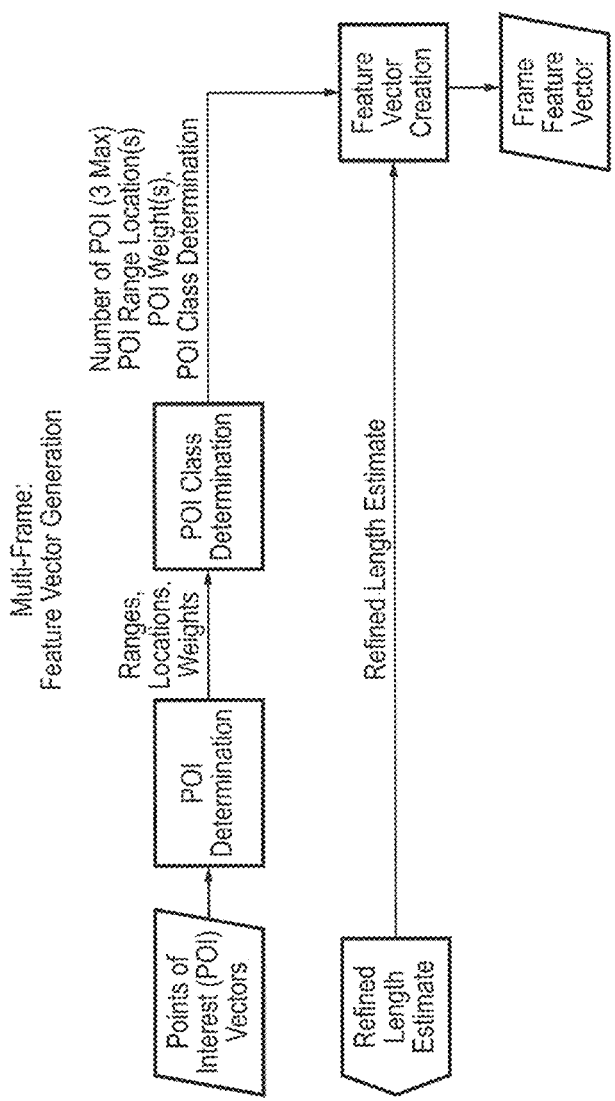
FIG. 3 is a block diagram of feature vector creation according to an embodiment of the present invention.

FIG. 3 represents the block diagram, in one embodiment, for the creation of a frame's feature vector. The Hough lines are initially used to isolate the target's center line in the image, its image line, and the refined length. The refined length estimate is formed by processing of the input sub-masked image using sum normalized range profile (SNRP) methodology. This length estimate is averaged (via median operator) with the previous 4 length determinations and is the first target feature. The purpose of the median operator is to avoid instantaneous erroneous fluctuations in the length estimates such as land returns and/or noise spikes. Using the locations of Hough lines and respective (line) designations, pertinent vertical lines are extracted. These lines are then compared with the locations of the peaks associated with the stored SNRP summed profile. If they occur in the same region, then the lines are designated as possible point of interest (POI) locations. If the Doppler extent is greater than a pre-determined threshold, the POI is deemed to be a possible reflector/rotator; otherwise it is deemed to be a possible mast/superstructure. Additional POI weighting occurs if high correlation exists with the SNRP peak locations. One range centroid of the POIs is stored for every target region; each such range centroid is then designated with a weight. If no POI exists in a region, the weighting is zero. The type designations for the POI are 0 for no POI, 1 for superstructure/mast, or 2 for rotator/reflector. The use of multiple regions may be advantageous in converting an otherwise 2-D feature extraction process into a 1-D process, in which the use of standard and more intricate classifiers can occur. This projection also speeds up the classification process. For larger targets, the use of more sections can also lead to a more refined POI range extent determination (ie. a superstructure may span multiple adjacent regions of the target).

For training purposes, in addition to feature vector input, the class's classifier parameters must be defined. Embodiments of the present invention encompass the Gaussian mixture model neural network (GMM-NN), the radial basis functions neural network (RBF-NN), the vector quantizer (VQ), and a classifier fusion method, which combines the class designations produced by all of these techniques.

Figure 4:
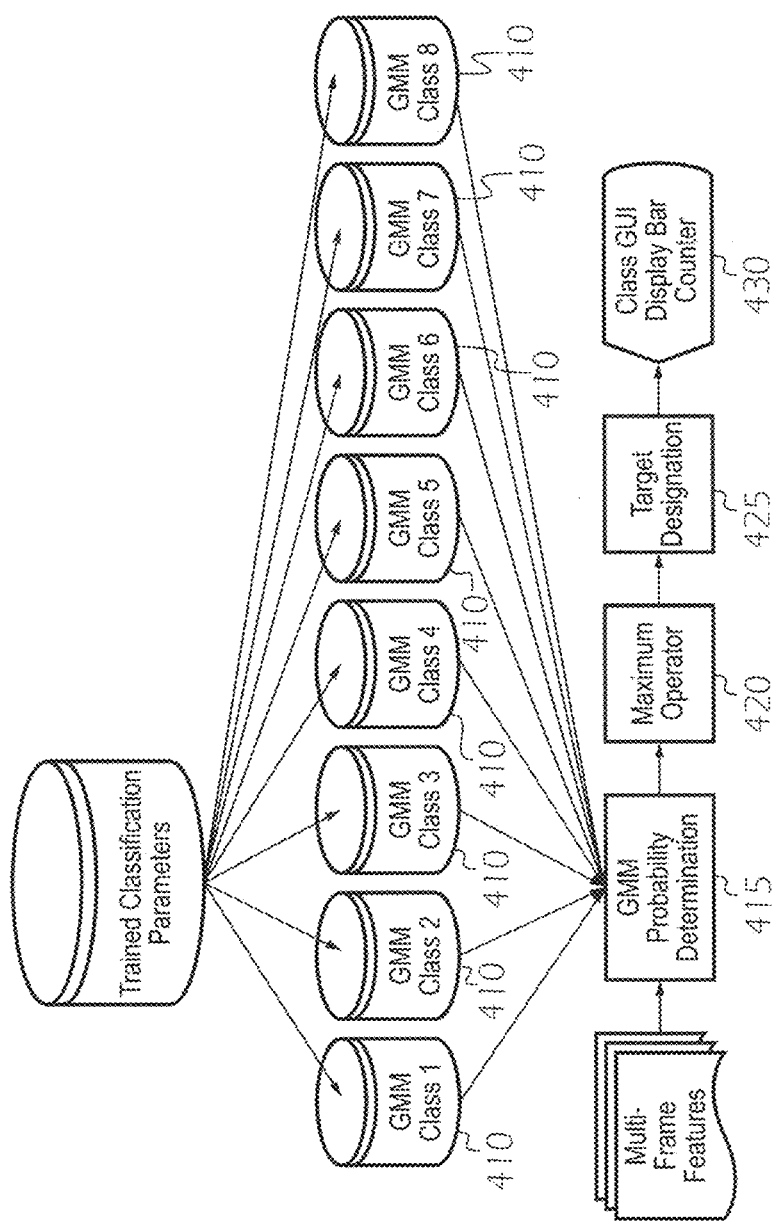
FIG. 4 is a block diagram for a predictive classification mapper for a Gaussian mixture model neural network according to an embodiment of the present invention.

FIG. 4 shows a block diagram for a predictive classification mapper employing a Gaussian mixture model neural network (GMM-NN) method. The parameters that need to be defined for the GMM-NN are the number of mixture components or centers in the model, the type of model, such as spherical, as well as its dimensionality. The Netlab neural network toolbox, part of the MATLAB™ package, available from The Mathworks, of Natick, Mass., may be used for the creation of the GMM with the 'gmm' function. GMM initialization then occurs by using the 'gmminit' function in the same toolbox. The expectation maximization (EM) algorithm is used to train the GMM and represent the class's input data as a mixture of weighted Gaussian components.

For testing purposes, each class 410 in the database (6 in one embodiment), as well as a class of unknown targets of significantly larger size (referred to herein as an "unknown large" target type) and a class of unknown targets of significantly smaller size (referred to herein as an "unknown small" target type) are represented by a set of GMM parameters, generated using the expectation maximization algorithm. The classes in the database are referred to herein as Class 1 through Class 6, or as "CGCPS", "TRB6", TWR823", "CGCT", "LA", and "MII"; these 6 classes and the "unknown small" and "unknown classes" are labeled "GMM Class 1" through "GMM class 8" in FIG. 4. When confronted with a test feature vector the MATLAB™ Netlab toolbox function 'gmmprob' is used to find the probability associated with each of the 8 GMM models (including the 6 classes in the database, and the unknown large and unknown small target types). The ensuing maximization is used as a reference for class designations. If a class designation is deemed applicable, then the maximization of the gmm probability corresponds to the class.

In one embodiment, the small unknown class is formed to include targets with lengths at least 20 feet smaller on average than the smallest true target length present in the database, and the large unknown class is formed with lengths exceeding by 30 feet those in the database. Uniform random variables are used to give variation to the lengths of both the small and large unknown targets. Other features, such as point of interest locations, their designations, and weights are randomly altered using random variables to also give variations to unknown target characteristics.

GMM probability determinations are made in a GMM probability determination block 415. The resulting probabilities are processed by a maximum operator 420 to arrive at a class designation for the target, or "target designation" in a corresponding block 425. When gmm probabilities are close among two classes as determined by their having a probability separation not exceeding a difference threshold, an ensuing joint class is determined. The target joint classes are "CGCPS-TRB6", "TWR823-CGCT", and "LA-MII", and are defined a priori by similarities of target length characteristics. If in this joint-class determination stage, the target matches two classes that do not correspond to any single joint class, then the class designation is referred to as "undetermined". Also, if the probability is below a pre-determined confidence threshold than the designation is deemed undetermined. These target designations are then kept track of using a bar counter 430 for display to an operator to attain a visual confidence on the designations.

Figure 5:
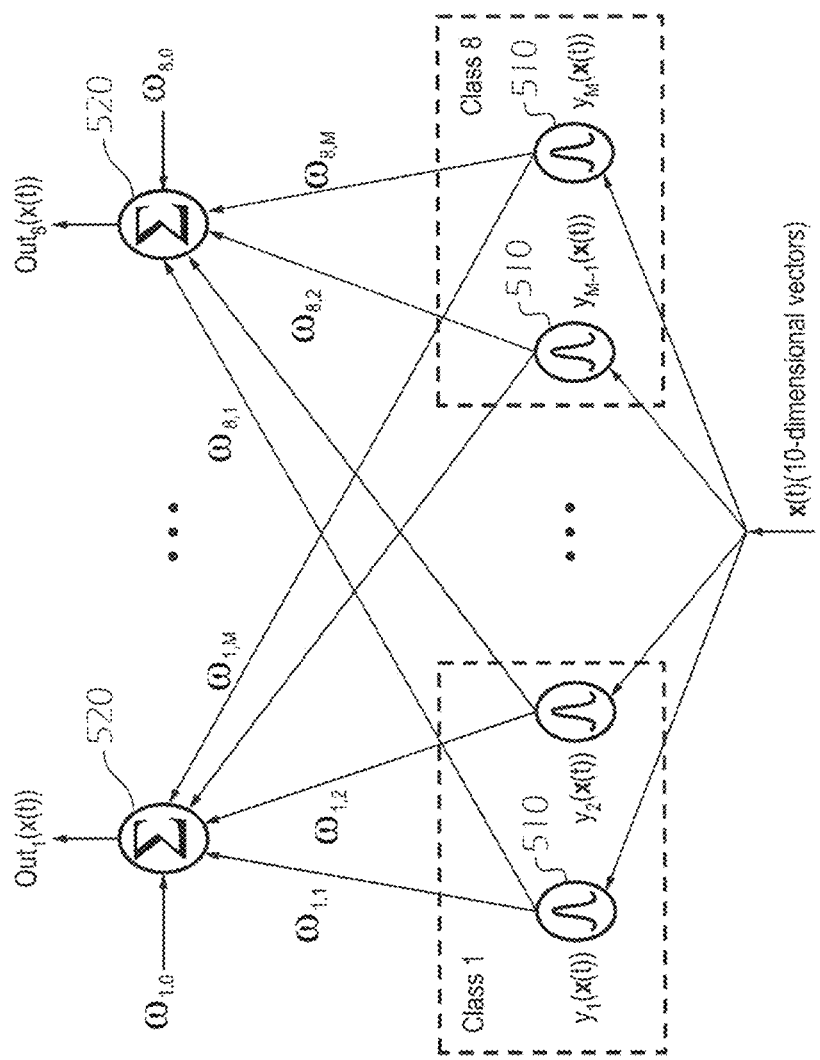
FIG. 5 is a block diagram for a predictive classification mapper for a radial basis function neural network according to an embodiment of the present invention.

FIG. 5 shows a block diagram for a predictive classification mapper for a radial basis function neural network (RBF-NN) method. As with the GMM-NN method, 8 classes (6 targets in the database, 1 for unknown large, and 1 for small unknown targets) are, in one embodiment, used with the RBF-NN method for training purposes. The unknown target classes utilize the same feature set variations as in the aforementioned GMM-NN method. With a RBF-NN, each hidden layer node, or "unit" 510 is represented with a bell shaped radial basis function that is centered on a vector in feature space.

In a Radial Basis Function (RBF) based Neural Network (NN), each neuron in the hidden layer is composed of an RBF that is the activation function. The weighting parameters represent the centers and widths of these neurons. The outputs are the linear combinations of the RBFs. In one embodiment each of the 8 classes has a group (e.g., 30) of hidden units 510, which is trained independently using the respective class's feature data. The input layer uses 10-dimensional feature vectors $x_t$, as inputs to the hidden layer:

$$y_m(x_t) = \exp\left\{-\frac{1}{2\sigma_m^2}(x_t - c_m)^T \sum_m^{-1} (x_t - c_m)\right\}$$

$$j = 1, \ldots, M$$

where M (e.g., 30) is the number of basis functions, $c_m$ and $\Sigma_m$ are the mean vector and covariance matrix of the m-th basis function respectively, and $\sigma_m^2$ is a smoothing parameter controlling the spread of the m-th basis function. The k-th output is a linear weighted sum of the basis functions' output, i.e., $$Out_k(x_t) = \omega_{k,0} + \sum_{m=1}^{M} \omega_{k,m} \phi_m(x_t)$$

$$t = 1, \ldots, N \text{ and } k = 1, 2, \ldots, 8$$

where $x_t$ is the t-th input vector, N is the number of independent and identically distributed patterns, and $\omega_{k,0}$ is a bias term. In FIG. 5, the linear combinations are formed by summation elements 520. The outputs from the hidden layer nodes are weighted by the weights of the lines, whereby the mean square error (MSE) criterion is used to adjust the weights. The steepest descent method may be used to train the feature vector inputs and their respective target output vectors. The MATLAB™ Netlab toolbox is utilized to directly train the RBF-NN. In one embodiment, a RBF network has 10 inputs (corresponding to the number of features in the feature vector), 8 outputs (for the number of classes), and 30 hidden units. The number of hidden units is found by weighing class separability, complexity, and NN ill-conditionality considerations. The MATLAB™ function 'rbf' constructs and initializes the RBF, with weights having a zero mean unit variance normal distribution, and having the hidden unit activation function given by $r^4 \log r$. The function 'rbfsetbf' may be used to set the basis functions of the RBF-NN, such that they model the unconditional density of the input feature dataset by training the inherent GMM with spherical covariances.

In one embodiment, the function 'rbftrain' is used to perform two stage training, to create a relationship between each row of an input feature vector and the corresponding class designation vector. The centers are determined by fitting a GMM with circular covariances using the expectation maximization (EM) algorithm. The maximum number of iterations is 100. For testing purposes, the 'rbffwd' function is used for forward propagation through the constructed RBF network with linear outputs. This results in an output vector of length 8 (8 being the number of classes), the elements of the vector corresponding to the likelihoods of being in the respective class. Thus, the index that corresponds to the maximum value is the designated class for that particular feature vector. When RBF likelihoods are close among two classes as determined by their having a likelihood separation not exceeding a difference threshold, an ensuing joint class is determined. The target joint classes are "CGCPS-TRB6", "TWR823-CGCT", and "LA-MIII", and are defined a priori by similarities of target length characteristics. If in this joint-class determination stage, the target matches two classes that do not correspond to any single joint class, then the class designation is undetermined. Also, if the probability is below a pre-determined confidence threshold than the designation is deemed undetermined. These target designations are then kept track of using a bar counter 430 for display to an operator to attain a visual confidence on the designations.

The Vector Quantization (VQ) method is simpler than the GMM-NN and RBF-NN methods, because it does not require training. The VQ method uses a criterion, in this case the Euclidean distances between the input feature set and all training feature sets, and tries to find the minimum (nearest neighbor) and its respective class designation. Because some features have inherently larger difference values than others, a scaling criterion is utilized. For example, the length feature difference may be scaled by 0.25. Similarly, POI weights are scaled by 0.1, while unity scales are kept for the POI positions and POI designations. In order to create different class designations, the two nearest neighbors are found. If both nearest neighbors occur in the same class (of the 8 possible classes), then the class designation is set to that class. If the two nearest neighbors occur in an a priori determined joint class, then the class designation is that joint class. If the two nearest neighbors differ and are from different joint-class members, then the class is undetermined. These target designations are then kept track of using a bar counter for display to an operator to attain a visual confidence on the designations.

The classifier fusion method utilizes, in one embodiment, the output class designations of the GMM-NN, RBFNN, and VQ methods and combines them into an overall class designation. First, the weightings for both the GMM-NN and RBF-NN are twice that of the VQ method. The VQ method may be used as a straw-man baseline for ATR purposes, so in this case it would act as a tie-break. In order to avoid having the VQ fall into too many tie-break situations, other avenues are incorporated. Such avenues include breaking up a joint-class designation into its class components when either the GMM-NN or the RBF-NN (not both) make an initial joint-class designation. If both the GMM-NN and RBF-NN class-designations are for joint classes then no break-up is instituted. The overall class decision is, in each case, the one receiving the largest number of weighted votes from the three classifiers, i.e., the mode of the weighted classifier decisions of the GMMNN, RBF-NN, and VQ classifiers. With several different approaches being combined, the fusion method provides a confidence value for the overall class designation. As with the individual classifiers, the target designations resulting from the classifier fusion are kept track of using a bar counter for display to an operator to attain an added visual confidence on the designations.

In one embodiment, a confidence metric, providing a measure of confidence in the class designation, or "confidence value", is provided. The frequency with which confidence values are updated is matched with the frequency of class designations, after an initial period during which a buffer is filled. The instantaneous confidence value is calculated as the ratio of the weighted number of votes, from the three individual classifiers, to the total weighted number of votes. Again the GMM-NN and RBF-NN classifiers' class designations are given twice the weighting of the VQ classifier's class designation. For example, if the GMM-NN, RBF-NN classifiers, each of which has a weight of 2, both vote for a first class (resulting in a weighted vote of 4 for the first class) and the VQ classifier, which has a weight of 1, votes for a second class (resulting in a weighted vote of 1 for the second class), the class designation generated by the fusion method is the first class (i.e., the class having received the largest number of weighted votes). The total number of weighted votes in this example is 5 and the confidence estimate is ⅘ or 0.8. To avoid momentary large changes in the confidence values a buffer of the current confidence value and the previous 9 confidence values is utilized and averaged. This confidence value is then converted into a percentage and is displayed. Until the buffer is filled, the displayed average confidence value is an average taken across the available confidence values.

Embodiments of the present invention include capabilities of the ISAR-ATR engine to handle incoming data that is classified as being from targets not currently residing in the database. For simplicity, targets that are significantly larger or smaller, as measured by length, than any in the database are synthesized and their features are varied to construct feature space areas where the classifiers can identify these unknown targets. When such a target is found, its features are automatically stored into an unknown training database for large and small targets. When enough of these feature sets are populated, re-training with the other database classes occurs, and the output classifier parameters are calculated and re-integrated into the testing process. This process is repeated. It is envisioned that this retraining process occurs at a frequency on the order of months. Successful handling of unknown unique targets can semi-automatically grow the current database and eventually handle the majority of existing ship classes. Due to the subjective nature of classifier training and optimizing, a human expert may participate in the training, insuring that class separation is adequate for proper class designations, by combining some feature sets into a single class if class separation is insufficient.

Figure 6:
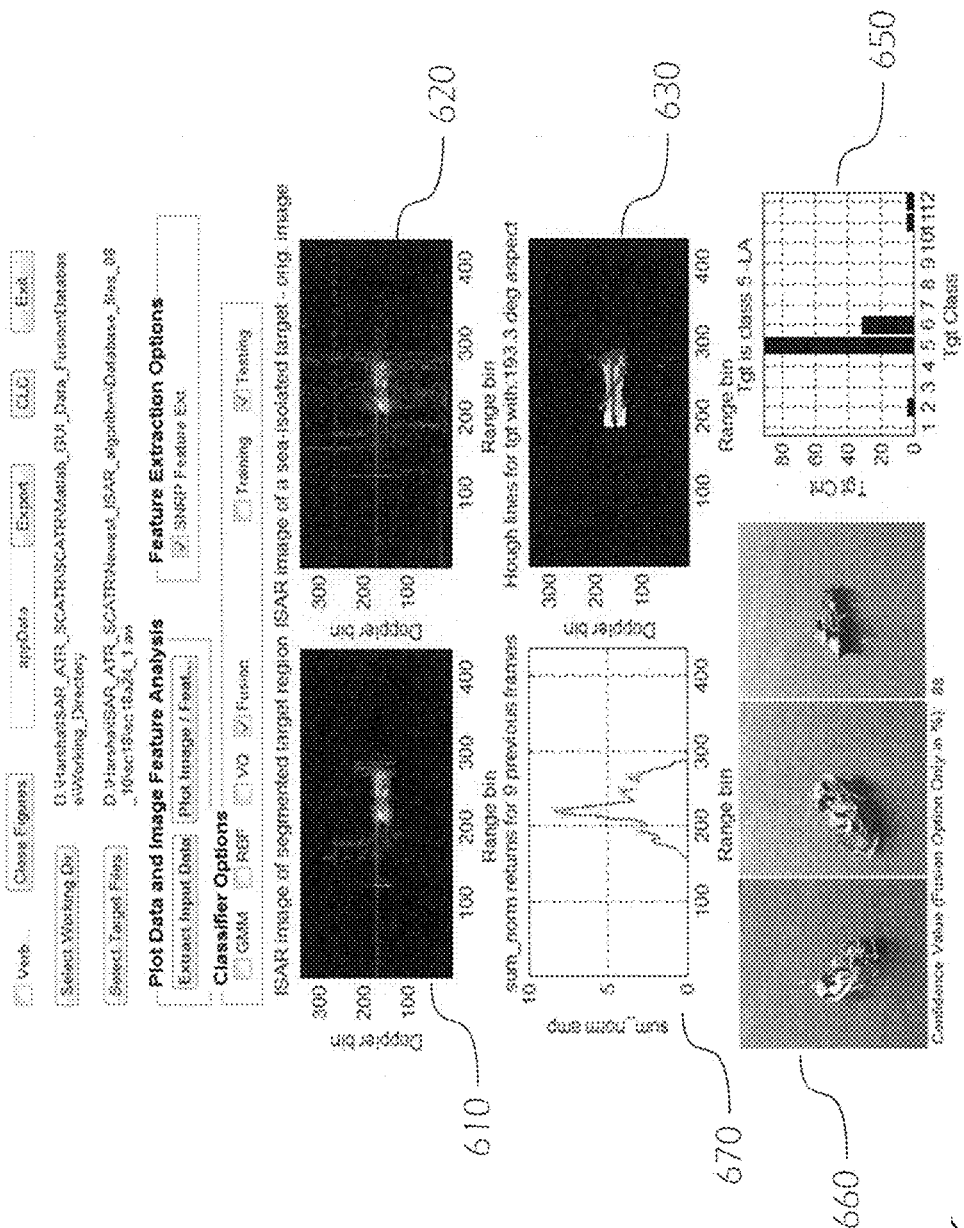
FIG. 6 is an illustration of a graphical user interface according to an embodiment of the present invention.

FIG. 6 shows a graphical user interface (GUI) which may be used to practice embodiments of the present invention. This GUI can also be used for training the classifiers (if applicable). The GUI internal output images include the original ISAR image 610 after initial target isolation, an image 620 including the original ISAR image, with an initial length estimate, which may be displayed as a bar of another color, e.g., red, overlaid on the black and white image, an image 630 including Hough Lines overlaid onto the thresholded ISAR image (which was input to the Hough processing block), showing center target lines (in a first color), possible POIs (in a second color), and peak SNRP locations (in a third color). A bar graph 650 shows the respective class designations, with title shown for the majority class. A set of real photographs 660 shows views from different angles of the as-determined class for the current frame. When the fusion classifier is used the confidence percentage for this frame's class designation is shown immediately below photographs 660. A graph 670 shows the SNRP profile sum (in a first color) from the previous 10 frames of buffered 1-D profiles, and extracted peak locations (each of which may be shown as an "X", in a second color).

Elements of embodiments of the present invention may be implemented using one or more processing units. Processing unit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). The term "processing unit" is used herein to include any combination of hardware, firmware, and software, employed to process data or digital signals. In a processing unit, as used herein, each function is performed either by hardware configured, i.e., hard-wired, to perform that function, or by more general purpose hardware, such as a CPU, configured to execute instructions stored in a non-transitory storage medium.

Although limited embodiments of a system and method for data fusion analysis for maritime automatic target recognition have been specifically described and illustrated herein, many modifications and variations will be apparent to those skilled in the art. The algorithms disclosed herein can be applied to any radar imaging mode, such as Synthetic Aperture Radar (SAR). Accordingly, it is to be understood that a system and method for data fusion analysis for maritime automatic target recognition employed according to principles of this invention may be embodied other than as specifically described herein. The invention is also defined in the following claims, and equivalents thereof.

What is claimed is:

1. A method for automatic target recognition of a target, the method comprising:
   receiving a sequence of imaging radar images of the target from an imaging radar system;
   forming a feature vector comprising measured characteristics of the target;
   performing a first target recognition attempt, the performing of the first target recognition attempt comprising:
      using a Gaussian mixture model neural network classifier to generate a first plurality of probability likelihoods, each of the first plurality of probability likelihoods corresponding to one of a plurality of candidate target types; and
      using a first set of class designation rules to produce a first class designation, the first class designation corresponding to one of the plurality of candidate target types;
   performing a second target recognition attempt, the performing of the second target recognition attempt comprising:
      using a radial basis function neural network classifier to generate a second plurality of probability likelihoods, each of the second plurality of probability likelihoods corresponding to one of a plurality of candidate target types; and
      using a second set of class designation rules to produce a second class designation, the second class designation corresponding to one of the plurality of candidate target types;
   performing a third target recognition attempt, the performing of the third target recognition attempt comprising:
      using a vector quantization classifier to generate a third plurality of probability likelihoods, each of the third plurality of probability likelihoods corresponding to one of a plurality of candidate target types; and using a third set of class designation rules to produce a third class designation, the third class designation corresponding to one of the plurality of candidate target types; and combining the first class designation, the second class designation and the third class designation to generate an overall class designation.

2. The method of claim 1, wherein the combining of the first class designation, the second class designation and the third class designation to generate an overall class designation comprises forming a weighted combination of the first class designation, the second class designation and the third class designation.

3. The method of claim 2, wherein the forming a weighted combination of the first class designation, the second class designation and the third class designation comprises weighting the first class designation with a weight of 2, weighting the second class designation with a weight of 2, and weighting the third class designation with a weight of 1.

4. The method of claim 3, comprising combining the first class designation, the second class designation and the third class designation to generate a confidence metric.

5. The method of claim 4, wherein the combining of the first class designation, the second class designation and the third class designation to generate a confidence metric comprises taking the ratio of:

the weights for class designations equal to the overall class designation; to the total of the weights for the first class designation, the second class designation and the third class designation.

6. The method of claim 1, wherein the plurality of candidate target types comprises a plurality of known target types and a joint target type.

7. The method of claim 1, wherein the plurality of candidate target types comprises an unknown target type.

8. The method of claim 7, wherein the plurality of candidate target types comprises an unknown large target type and an unknown small target type.

9. The method of claim 8, wherein the unknown large target type includes targets with an estimated length exceeding a length of a largest known target type by 30 feet.

10. The method of claim 8, wherein the unknown small target type includes targets with an estimated length less than a length of a smallest known target type by 20 feet.

11. The method of claim 7, wherein:
the Gaussian mixture model neural network classifier comprises classification parameters; and
one of the classification parameters is adjusted in response to class designations corresponding to an unknown target type.

12. The method of claim 1, wherein the plurality of candidate target types comprises an undeterminable target type.

13. The method of claim 12, wherein the using of a first set of class designation rules to produce a first class designation comprises producing a first class designation corresponding to the undeterminable target type when each of the first plurality of probability likelihoods is less than a first threshold.

14. The method of claim 12, wherein the using of a second set of class designation rules to produce a second class designation comprises producing a second class designation corresponding to the undeterminable target type when each of the second plurality of probability likelihoods is less than a second threshold.

15. The method of claim 1, wherein the receiving of a sequence of imaging radar images of the target comprises receiving a sequence of inverse synthetic aperture radar images of the target.

16. A system for automatic target recognition of a target, the system comprising a processing unit configured to:
receive a sequence of imaging radar images of the target;
form a feature vector comprising measured characteristics of the target;
perform a first target recognition attempt, the performing of the first target recognition attempt comprising:
using a Gaussian mixture model neural network classifier to generate a first plurality of probability likelihoods, each of the first plurality of probability likelihoods corresponding to one of a plurality of candidate target types; and
using a first set of class designation rules to produce a first class designation, the first class designation corresponding to one of the plurality of candidate target types;
perform a second target recognition attempt, the performing of the second target recognition attempt comprising:
using a radial basis function neural network classifier to generate a second plurality of probability likelihoods, each of the second plurality of probability likelihoods corresponding to one of a plurality of candidate target types; and
using a second set of class designation rules to produce a second class designation, the second class designation corresponding to one of the plurality of candidate target types;
perform a third target recognition attempt, the performing of the third target recognition attempt comprising:
using a vector quantization classifier to generate a third plurality of probability likelihoods, each of the third plurality of probability likelihoods corresponding to one of a plurality of candidate target types; and
using a third set of class designation rules to produce a third class designation, the third class designation corresponding to one of the plurality of candidate target types; and
combine the first class designation, the second class designation and the third class designation to generate an overall class designation.

17. The system of claim 16, wherein the combining of the first class designation, the second class designation and the third class designation to generate an overall class designation comprises forming a weighted combination of the first class designation, the second class designation and the third class designation.

18. The system of claim 17, wherein the forming a weighted combination of the first class designation, the second class designation and the third class designation comprises weighting the first class designation with a weight of 2, weighting the second class designation with a weight of 2, and weighting the third class designation with a weight of 1.

19. The system of claim 18, comprising combining the first class designation, the second class designation and the third class designation to generate a confidence metric.

20. The system of claim 19, wherein the combining of the first class designation, the second class designation and the third class designation to generate a confidence metric comprises taking the ratio of:
the weights for class designations equal to the overall class designation; to the total of the weights for the first class designation, the second class designation and the third class designation.

* * * * *